Feb. 15, 1944.    R. CLADE    2,341,692
PLUG VALVE
Filed July 28, 1942
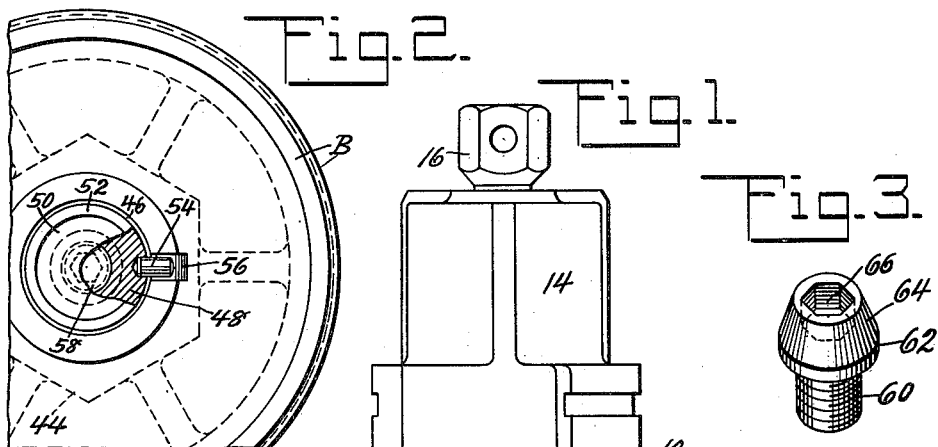
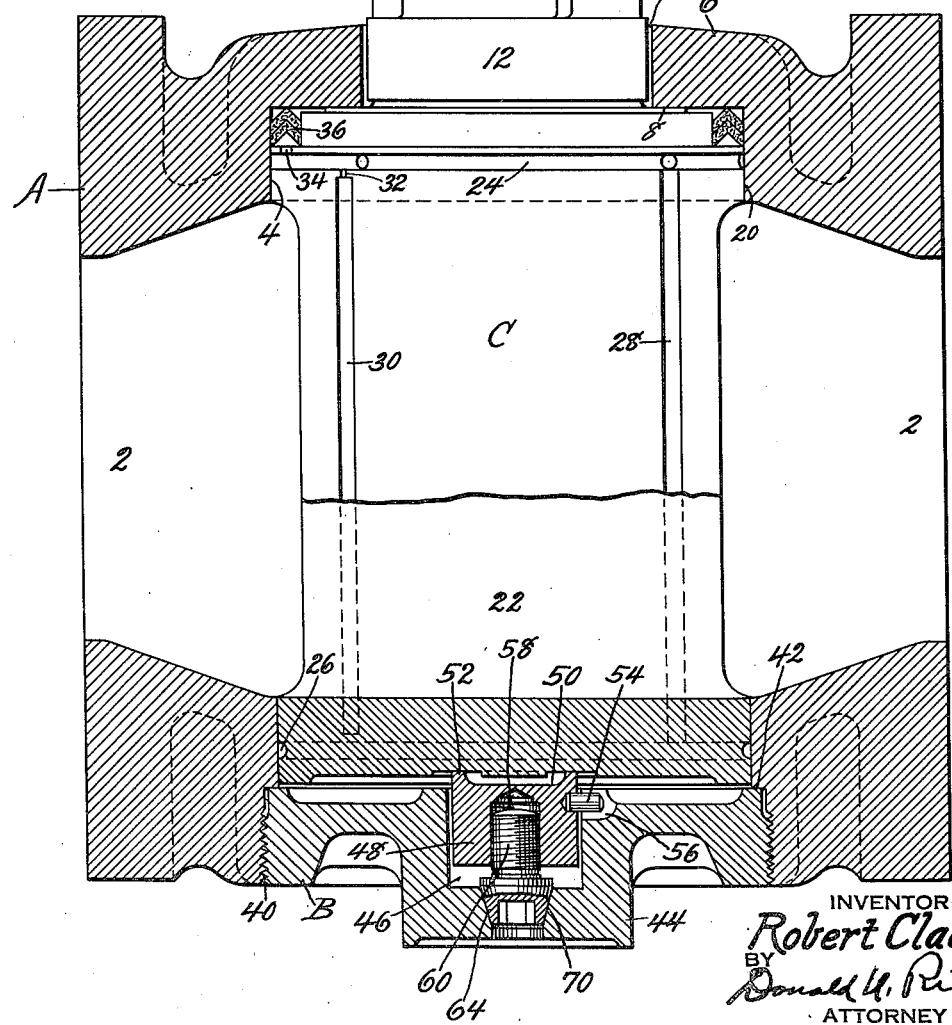
INVENTOR
*Robert Clade*
BY
*Donald U. Rich*
ATTORNEY Patented Feb. 15, 1944

2,341,692

UNITED STATES PATENT OFFICE 2,341,692

PLUG VALVE

Robert Clade, Detroit, Mich., assignor to American Car and Foundry Company, New York, N. Y., a corporation of New Jersey Application July 28, 1942, Serial No. 452,598

8 Claims. (Cl. 251—91)

This invention relates to valves in general and in particular to plug valves.

In constructing plug valves of either the cylindrical or tapered type it is generally necessary to provide a support for the base of the plug. This support should be adjustable in order that the plug may be properly positioned in the valve body, but the majority of supports as used in the past have permitted a certain amount of leakage if the support could be readily adjusted from the exterior of the valve body. It is an object, therefore, of the present invention to provide a support for the plug of a valve, which support can be readily adjusted from the exterior of the body.

A further object of the invention is the provision of an externally adjustable support for a valve plug with the support constituting a second valve preventing leakage of material.

A still further object of the invention is the provision of an externally adjustable support for a valve plug with the support having a tapered end supported in a tapered socket in the valve body.

A yet further object of the invention is the provision of an externally adjustable support for a valve plug with the support so constructed as to be contained wholly within the clearance limits of the valve body.

These and other objects of the invention will be apparent to persons skilled in the art from a study of the following description and accompanying drawing, in which Figure 1 is a longitudinal sectional view taken through the improved valve;

Fig. 2 is a plan view of the base cap with parts broken away to better disclose the construction, and Fig. 3 is a perspective view of a portion of the plug support.

Referring now to the drawing in detail, it will be seen that the valve is constructed with a main body part A including a base cap B which supports and retains the valve plug C in the valve body proper. The valve body proper is formed with flow passageways 2 intersected by a cylindrical passageway formed with finished surfaces 4 adapted to closely contact the finished surfaces of the plug. The cylindrical passageway does not extend completely through the valve body but terminates short of the exterior in order to provide an overlapping portion 6 at the head of the valve. The inner surface 8 of this overlapping portion is finished in order to provide a plane surface for contact with a part of the valve plug. The overlapping portion 6 of the valve body proper is formed with an opening 10 adapted to receive therein the stem 12 of the valve plug. The plug as shown is of well known design having a squared upper end 14 for receiving a wrench or other operating device and with the stem axially pierced to receive a screw or ram 16 by means of which lubricant may be forced through the stem into lubricant passages formed either in the plug or in the body. As shown in Fig. 1 the part of the plug located within the valve body is of cylindrical form having a finished surface 20 adapted to cooperate with the finished surface of the cylindrical passage in the body. In order to permit flow of material through the plug a transverse passageway 22 is cut therethrough and of substantially the same cross sectional area as the passageways 2 in the body, thus giving unrestricted flow of material through the valve when the plug is in an open position. The cylindrical surface of the valve plug is interrupted by a series of lubricant channels so arranged as to carry lubricant to the points requiring lubrication and at all times while restricting the flow of lubricant under certain conditions and in certain positions of the valve plug. This lubrication of the plug and conservation of the lubricant is accomplished by cutting top and bottom circumferential grooves 24 and 26 and connecting these circumferential grooves by diametrically opposed longitudinally extending grooves 28. Other diametrically opposed longitudinally extending grooves 30 are provided but these grooves, in order to conserve lubricant, are connected to the top circumferential groove at all times by a small passage or groove 32. In order to additionally conserve lubricant the grooves 30 are not connected with the bottom circumferential groove 26 but stop short thereof. This is necessary since the lubricant in groove 26 is at a much lower pressure than that in groove 24 and would be more readily washed out by line pressures. In order to lubricate the top portion of the valve a small passage 34 is provided connecting the circumferential groove 24 with a space defined by the plug and by the overlapping head portion of the valve. The lubricant escaping through passage 34 will act to expand inverted V shape packing rings 36 located in the space just referred to. Expansion of these sealing members will prevent escape of lubricant and at the same time prevent escape of fluid under pressure from the line through the head of the valve.

As clearly shown in Fig. 1, the valve plug is retained in the valve body by means of the base cap B previously referred to. This base cap has threaded engagement as at 40 with an enlargement of the cylindrical passage in the body and has its top surface finished as at 42 to contact with a finished overhanging surface in the valve body. The base cap is provided with a centrally located enlargement 44 by means of which the cap may be screwed tightly into the body thereby preventing leaks at the threaded joint. The interior of the central projection of the base cap is bored out to provide a centrally located cavity 46. This cavity is adapted to receive a stool or plug support part 48 of a diameter slightly less than the diameter of the cavity. This stool or support has the upper surface relieved as at 50 in order that an annular bearing surface 52 may be presented and bear against the lower surface of the valve plug. This stool or support part is cylindrical in form but is prevented from rotating in the cavity by means of a pin 54 driven into the stool and projecting into a slot 56 milled or otherwise cut in the base cap adjacent the cavity. In order to hold the stool or plug support part in its desired position in the base cap cavity it is centrally bored and tapped as at 58 to receive the threaded portion 60 of a support bolt. This support bolt is provided with a head portion 62 having the sides turned to provide a tapered or truncated conical surface 64. Rotation of the support bolt is accomplished by insertion of a properly formed tool in the recess 66 formed in the bolt head and of hexagonal form in the present case. The tapered surface 64 of the support bolt is seated within a similarly tapered surface 70 formed in the base cap and as part of a passage extending centrally through the cap from the exterior into the cavity 46. The surfaces 64 and 70 are carefully lapped so as to prevent passage of material from the base cap cavity to the exterior.

The valve will be assembled as any other valve of a similar type would be assembled but with the adjustable support located within the cavity of the base cap. After the base cap is securely tightened into position, then the support bolt will be turned to raise the stool upward against the bottom portion of the plug. This is possible since the tapered head of the bolt can freely turn in the tapered seat of the base cap, while the stool or support portion cannot turn in the base cap due to the pin 54. After the plug is raised and held in its proper position by the plug support unit formed of the stool and bolt, the adjustment cannot be varied since the stool cannot turn with the plug. Any leakage of material that may occur past the bottom circumferential groove 26 cannot escape from the valve body since the tapered portion 64 of the bolt is firmly seated on the tapered portion 70 of the base cap and will be tightly jammed by any of the material to escape. In practice and for ease in operation as well as to increase the sealing effect, the cavity 46 is preferably filled with lubricant at the time of assembly. This filling will prevent corrosion that might eventually cause the stool to stick in the cavity or spoil the tapered seating surfaces of the cap and bolt forming part of the support unit.

While the invention has been described more or less in detail, it will be obvious to persons skilled in the art that various modifications and rearrangements of parts may be made without departing from the scope of the following claims defining my invention.

What is claimed is:

1. In a plug valve, a valve body having a first passageway therethrough for the flow of matter, a second passageway formed in said body and extending transversely of said first passageway, a valve plug rotatably mounted in said second passageway for controlling the flow of matter through said first passageway, a cap closing one end of said second passageway to retain said valve plug in said valve body and having a cavity formed therein, and adjustable means including a support member non-rotatably mounted within said cavity and axially movable relative to said cap to support the valve plug in proper position in said valve body.

2. In a plug valve, a valve body having a first passageway therethrough for the flow of matter, a second passageway formed in said body and extending transversely of said first passageway, a valve plug rotatably mounted in said second passageway for controlling the flow of matter through said first passageway, a cap closing one end of said second passageway to retain said valve plug in said valve body and having a cavity formed therein, and adjustable means positioned in said cavity and movable relative to said cap to support the valve plug in proper position in said valve body, said adjustable means comprising a support member engaging the lower end of the plug and a tapered head bolt threaded therein.

3. In a plug valve, a valve body having a first passageway therethrough for the flow of matter, a second passageway formed in said body and extending transversely of said first passageway, a valve plug rotatably mounted in said second passageway for controlling the flow of matter through said first passageway, a cap closing one end of said second passageway to retain said valve plug in said valve body and having a cavity formed therein, a support member for the valve plug slidably mounted within the cavity, a bolt located in said cavity and having threaded engagement with said support member, said bolt being formed with a tapered head, and a tapered seat formed in said cap to receive the tapered bolt head.

4. In a plug valve, a valve body having a first passageway therethrough for the flow of matter, a second passageway formed in said body and extending transversely of said first passageway, a valve plug rotatably mounted in said second passageway for controlling the flow of matter through said first passageway, a cap closing one end of said second passageway to retain said valve plug in said valve body and having a cavity formed therein, a support member for the valve plug slidably mounted within the cavity, means to adjust the position of said support member to retain the valve plug in proper position in the valve body, and an opening extending through said cap into said cavity whereby said means may be adjusted, said means sealing said opening to prevent leakage from said cavity.

5. In a plug valve, a valve body having a first passageway therethrough for the flow of matter, a second passageway formed in said body and extending transversely of said first passageway, a valve plug rotatably mounted in said second passageway for controlling the flow of matter through said first passageway, a cap closing one end of said second passageway to retain said valve plug in said valve body and having a cavity formed therein, and non-rotatable means housed within said cavity and axially shiftable relative to said cap to support the valve plug in proper position in said valve body, said means being adjustable and accessible for adjustment from the exterior of said cap and located wholly within the external boundaries of said cap.

6. In a plug valve, a valve body having a first passageway therethrough for the flow of matter, a second passageway formed in said body and extending transversely of said first passageway, a valve plug rotatably mounted in said second passageway for controlling the flow of matter through said first passageway, a cap closing one end of said second passageway to retain said valve plug in said valve body and having a cavity formed therein, a support member for the valve plug slidably mounted in the cavity, a bolt threaded in said support member to adjust the position thereof and retain the valve plug in proper position in the valve body, an opening extending through said cap into said cavity whereby said bolt may be adjusted from the exterior of the valve body, said opening being formed with an enlarged inner end providing a tapered seat, and a tapered head formed on said bolt and engageable with said tapered seat to seal the opening and prevent leakage from said cavity.

7. In a plug valve, a valve body having a first passageway therethrough for the flow of matter, a second passageway formed in said body and extending transversely of said first passageway, a valve plug rotatably mounted in said second passageway for controlling the flow of matter through said first passageway, a cap closing one end of said second passageway to retain said valve plug in said valve body and having a cavity formed therein, and non-rotatable means housed within said cavity and axially shiftable relative to said cap to support the valve plug in proper position in said valve body, said means being adjustable and accessible for adjustment from the exterior of said cap and located wholly within the external boundaries of said cap, and said means being sealed with respect to said cap thereby preventing leakage from said cavity to the exterior of said valve body.

8. In a plug valve, a body having a head portion, a plug rotatably mounted in the body, a base cap provided with a cavity opening toward the head portion, means for retaining the upper end of said plug in engagement with said head portion comprising a support member engaging the lower end of the plug and arranged in said cavity for axial but non-rotating movement, and shifting means for said support member rotatably mounted in the base cap.

ROBERT CLADE.